(12) United States Patent
Szita et al.

(10) Patent No.: US 6,754,032 B1
(45) Date of Patent: Jun. 22, 2004

(54) METHOD AND SYSTEM FOR RADIAL AND CIRCUMFERENTIAL ALIGNMENT OF DATA TRACKS ON PATTERNED MEDIA

(75) Inventors: Gabor Szita, Santa Clara, CA (US); Karl A. Belser, San Jose, CA (US)

(73) Assignee: Seagate Tech. LLC, Scotts Valley, CA (US)

( * ) Notice: Subject to any disclaimer, the term of this patent is extended or adjusted under 35 U.S.C. 154(b) by 355 days.

(21) Appl. No.: 09/695,186

(22) Filed: Oct. 23, 2000

Related U.S. Application Data

(60) Provisional application No. 60/170,240, filed on Dec. 10, 1999, provisional application No. 60/167,953, filed on Nov. 29, 1999, and provisional application No. 60/161,131, filed on Oct. 22, 1999.

(51) Int. Cl.$^7$ .......................... G11B 5/596; G11B 15/12
(52) U.S. Cl. .................. 360/77.08; 360/63; 360/78.04; 360/77.04
(58) Field of Search ......................... 360/77.04, 77.08, 360/77.09, 77.02, 61, 63, 75

(56) References Cited

U.S. PATENT DOCUMENTS

| 4,412,165 A | * | 10/1983 | Case et al. .................. 318/636 |
| 6,392,834 B1 | * | 5/2002 | Ellis ........................ 360/77.04 |
| 6,504,668 B1 | * | 1/2003 | Takeuchi et al. ......... 360/77.04 |

* cited by examiner

Primary Examiner—Andrew L. Sniezek
(74) Attorney, Agent, or Firm—Kirk A. Cesari

(57) ABSTRACT

Radial correction factors are calculated for each ruler on a patterned media in a data storage system. A ruler is a position-sensing pattern that defines the radial position of a recording head. Rulers are patterned onto each disk before the disks are assembled into a storage system. The radial correction factors are then added to the measured position information during read and/or write operations of the data storage system. The radial correction factors correct for any radial misalignment created by disturbances in the data storage system. Circumferential correction factors are calculated for each patterned media in the data storage system. A corrected sector number is then determined by redefining the original sector numbers using the circumferential correction factors.

15 Claims, 15 Drawing Sheets

METHOD AND SYSTEM FOR RADIAL AND CIRCUMFERENTIAL ALIGNMENT OF DATA TRACKS ON PATTERNED MEDIA

CROSS-REFERENCE TO RELATED APPLICATIONS

This application is related to and claims the benefit of commonly assigned U.S. Provisional Application No. 60/161,131, filed on Oct. 22, 1999 and entitled "Method For Writing Concentric Servo Tracks Based On Pre-Formed Servo Pattern", and U.S. Provisional Application No. 60/167,953, filed on Nov. 29, 1999 and entitled "Method To Insure Radial And Circumferential Alignment Of Data Tracks In Hard Disk Drives Employing Servo-Patterned Media." The subject matter of these related applications are incorporated herein by reference.

This application is related to U.S. Provisional Patent Application Serial No. 60/170,240, entitled "Virtual Tracks For Repeatable Runout (RRO) Management", filed on Dec. 10, 1999. All related applications are commonly assigned.

BACKGROUND

1. Field of the Invention

The present invention relates to data storage systems, and more particularly to data storage systems that store data in tracks on a patterned media. Still more particularly, the present invention relates to a method and system for radial and circumferential alignment of data tracks on patterned media.

2. Description of the Prior Art

Data storage systems record and reproduce data stored on a recording medium. Conventional systems typically include one or more storage disks in the storage system. The recording medium generally takes the form of a circular storage disk having a plurality of concentric data tracks formed thereon. Magnetic and optical disks are two examples of storage disks that are used in data storage systems.

The positioning of one or more recording heads relative to the data tracks is generally accomplished by incorporating a closed-loop, electro-mechanical servo system. The implementation of the servo system may include a dedicated servo surface that is associated with one of the plurality of heads in the data storage system. Alternatively, short bursts of servo data, referred to as a servo burst field, may be written amid the contents of the user data tracks. One technique used to form the servo data on a disk is to use a servo track writer. A servo track writer writes the servo data and a control system monitors the servo surface or the servo burst field data to maintain the position of the heads relative to the concentric tracks on the disk(s). Unfortunately, as track density increases, conventional servo track writers are unable to write servo data with the necessary accuracy.

One method for improving the servo data density on a storage disk is to use patterned media. A patterned media is a storage disk having a combination of raised features and depressed features in or on the surface of the disk. The servo marks are formed on each surface of a disk before the disk is built into a storage system. When fabricating patterned disks, typically one surface of a disk is patterned first, and when the patterning process for the first surface is complete, the pattern is then formed on the second surface of the disk.

The disks are built into a storage system after all of the disk surfaces have been patterned. The disks are typically placed on a shaft that fits into a hole at the center of each disk. The disks are then clamped into place in order to secure each disk in a fixed plane, one above the other. Each disk will then rotate around the shaft at its corresponding center.

Unfortunately, the positioning of the disks relative to the shaft is influenced by various tolerances, including shaft and clamp tolerances. FIG. 1 depicts a data track written on a patterned storage disk. A patterned storage disk 100 is rotated by a spindle motor mounted at the center 102 of the storage disk 100. The solid line 104 represents the ideal track. The dashed line 106 represents the actual center of the track written on the disk after the disk is installed in the storage system. As can been seen, the track 106 is not a concentric circle on the disk. Instead, track 106 has been written eccentric in relation to the center of the disk 100 (or to the center of balance of the disk).

Additionally, the tracks are not necessarily lined up from one disk surface to another disk surface. This is known as radial misalignment. Radial misalignment and eccentricity mean the servo system has to work harder to follow the track and to find the same track on another disk.

Another limitation to patterned storage disks is that once the disks are assembled into the storage system, the sectors may not be aligned from one disk to another. FIG. 2 illustrates a sector on two disks in a conventional data storage system. Storage disk 200 is positioned directly above storage disk 202 in the data storage system. Storage disk 200 has a sector 206 located at a particular location on the surface of the storage disk 200. Ideally, sector 206 should be located at the same particular point (point 208) on storage disk 202. Unfortunately, due to circumferential misalignment, sector 206 is actually located at another location on the disk 202. This means that when the recording head is switched in order to read (or write) data on disk 202, the sector number on the surface of disk 202 can be independent of the last sector number obtained from the surface of disk 200. Circumferential misalignment can significantly increase access times and reduce the performance of the system.

SUMMARY

The present invention overcomes the limitations of the prior art by providing a method and system for radial and circumferential alignment of data tracks. The radial alignment is accomplished by first calibrating the system to determine radial correction factors. The servo system is then activated, and the final servo patterns are written using the radial correction factors. The final servo patterns are written as concentric tracks on each disk in the data storage system.

The calibration for the radial alignment begins by keeping the head in a fixed position. The position information is read from the disk and a radial correction factor is calculated for each ruler on the disk. A ruler is a position-sensing pattern that defines the radial position of a recording head. The rulers are patterned onto each disk before the disks are assembled into a storage system. The radial correction factors are then used by the servo system when writing the final servo patterns to write concentric tracks on the disk. The radial correction factors are added to the measured position information to form a feedback signal that is input into a controller to cancel the eccentricity and other disturbances.

The number of times a head travels over a boundary is taken into account when accurately determining the position of the head during the calibration process. The variable k denotes the ruler number and $Q_k$ denotes the quadrant at the $k^{th}$ ruler. The variable T denotes the number of wrap-overs from quadrant 4 to 1 minus the number of wrap-overs from quadrant 1 to 4. Initially, the system waits until the ruler number equals zero, and then sets T equal to zero. If $Q_k$ equals one and $Q_{k-1}$ equals four, then T=T+1. If however, If $Q_k$ equals four and $Q_{k-1}$, equals one, then T=T−1. The correction factor $w_k$ is then computed at block by adding T to the measured position information $m_k$. If the ruler number (k) is less than the number of rulers (n), the variable k is incremented and the system waits for the next ruler. The process ends when a correction factor $w_k$ has been determined for each ruler.

In another aspect of the invention, the circumferential offsets of the disks in the data storage system are determined. In the exemplary embodiment described herein, the number of servo sectors are numbered from zero (0) to m, and the number of heads and their corresponding disk surfaces are numbered from zero (0) to h. The variable $k_m$ represents the sector number provided by the pattern, and the variable $k_c$ denotes the corrected sector number.

The process begins by switching to head 0 and waiting until sector 0 is detected. Once sector 0 is detected, the system switches to head i (where $0 \leq i \leq h$). The circumferential correction factor $c_i$ is then set to the number of the next sector detected on head i. This procedure repeats for each head in the system (except head 0). A corrected sector number is then determined by redefining the original sector numbers using the circumferential correction factors. During normal operation of the storage system, the corrected sector numbers are determined by the equation $k_c = \mathrm{mod}(k_m - c_i + m, m)$, where mod (a,b) denotes the remainder of the division a/b. The corrected sector numbers are used to provide circumferential position information for the read and write operations.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

The present invention relates to a method and system for radial and circumferential alignment of data tracks in a patterned media. The following description is presented to enable one of ordinary skill in the art to make and use the invention and is provided in the context of a specific embodiment, namely a hard disk drive system. However, the present invention is not limited to this embodiment. Various modifications to the specific embodiments will be readily apparent to those skilled in the art and the generic principles herein may be applied to other implementations that utilize patterned media for data storage. Thus, the present invention is not intended to be limited to the embodiment shown but is to be accorded the widest scope consistent with the appended claims and with the principles and features described herein.

Figure 1:
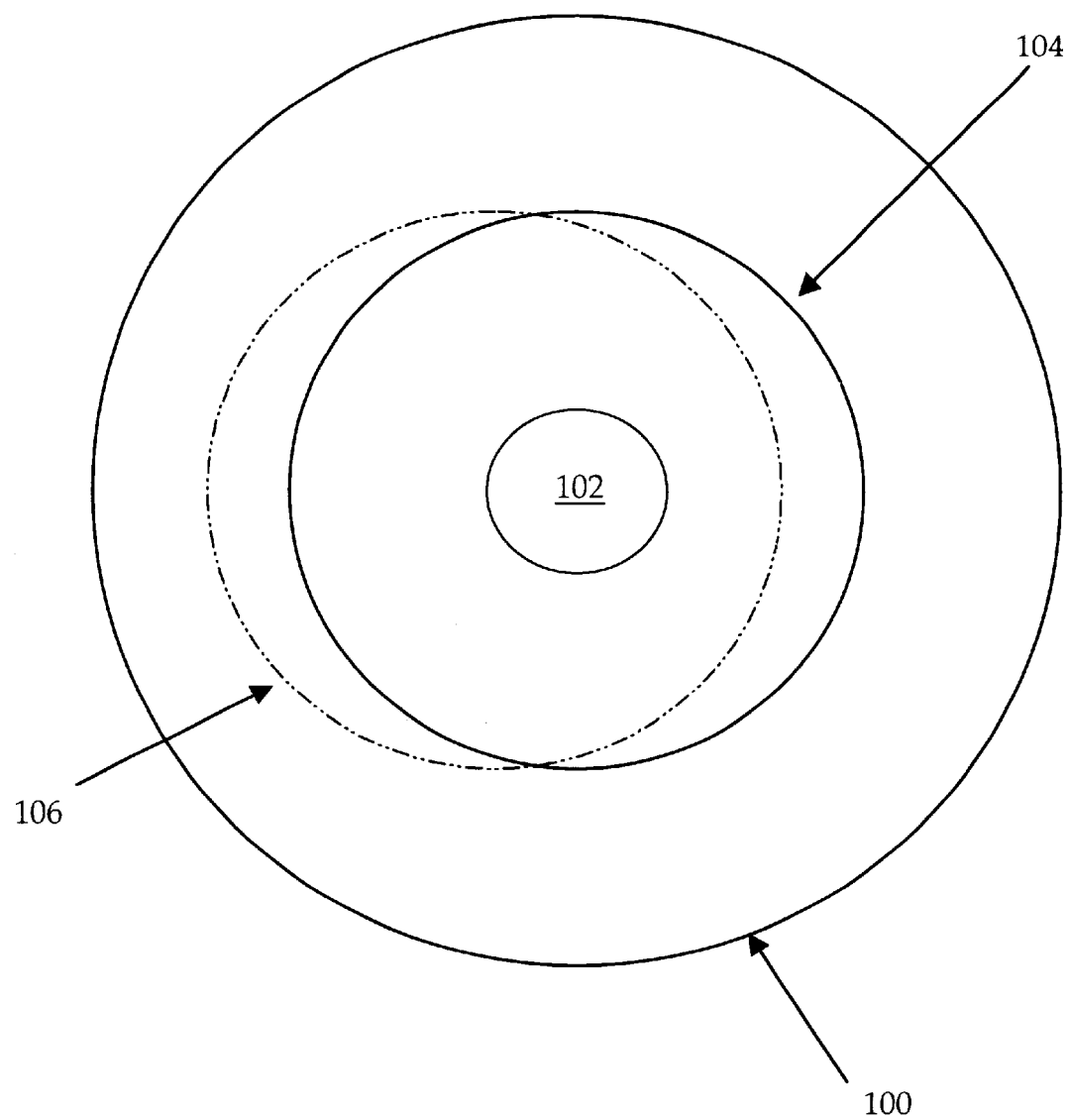
FIG. 1 depicts a data track written on a patterned storage disk.
Figure 2:
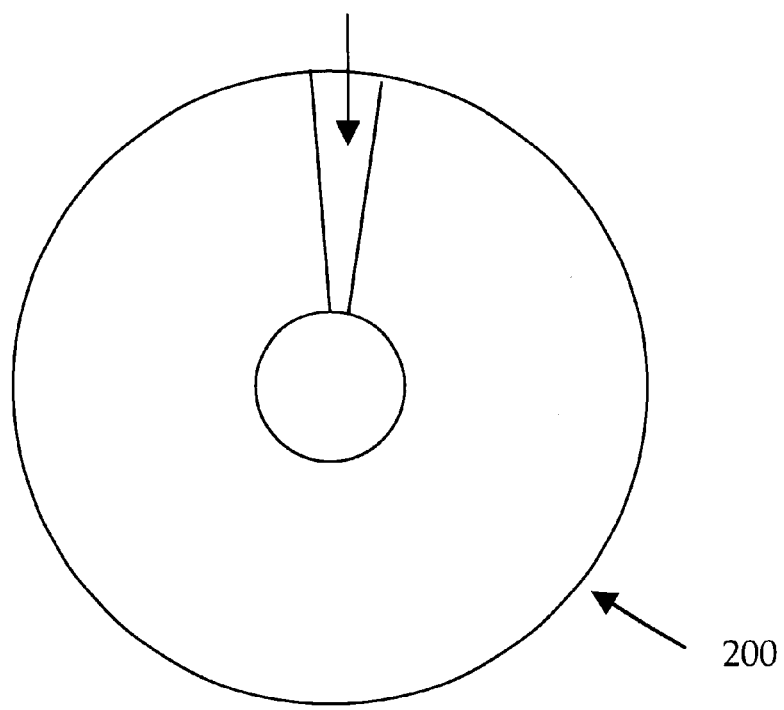
FIG. 2 illustrates a sector on two disks in a conventional data storage system.
Figure 2:
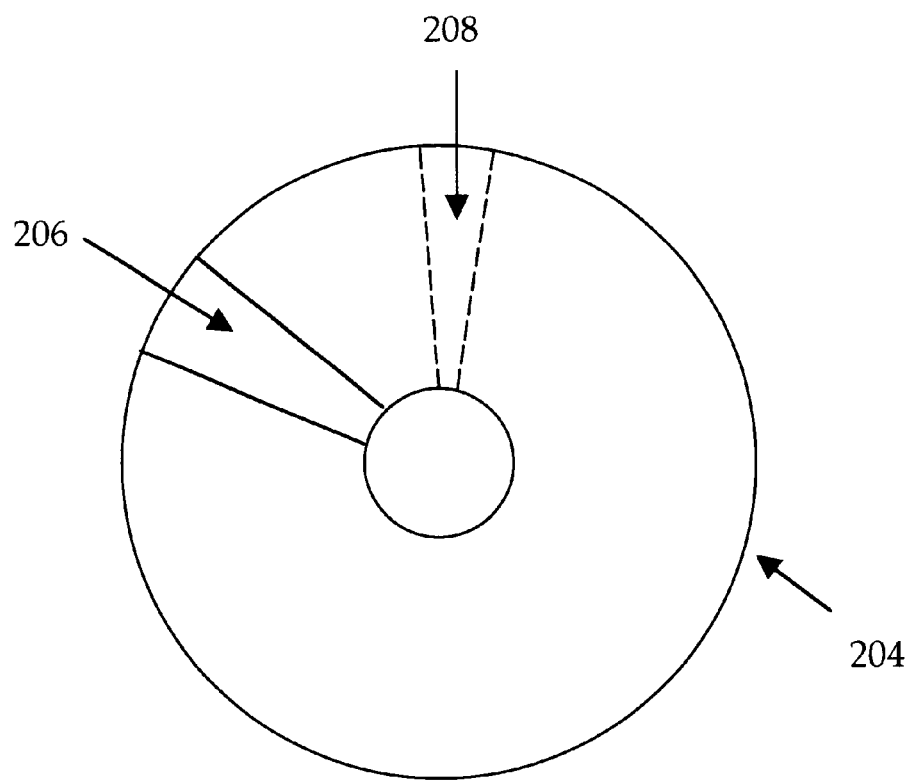
Figure 3:
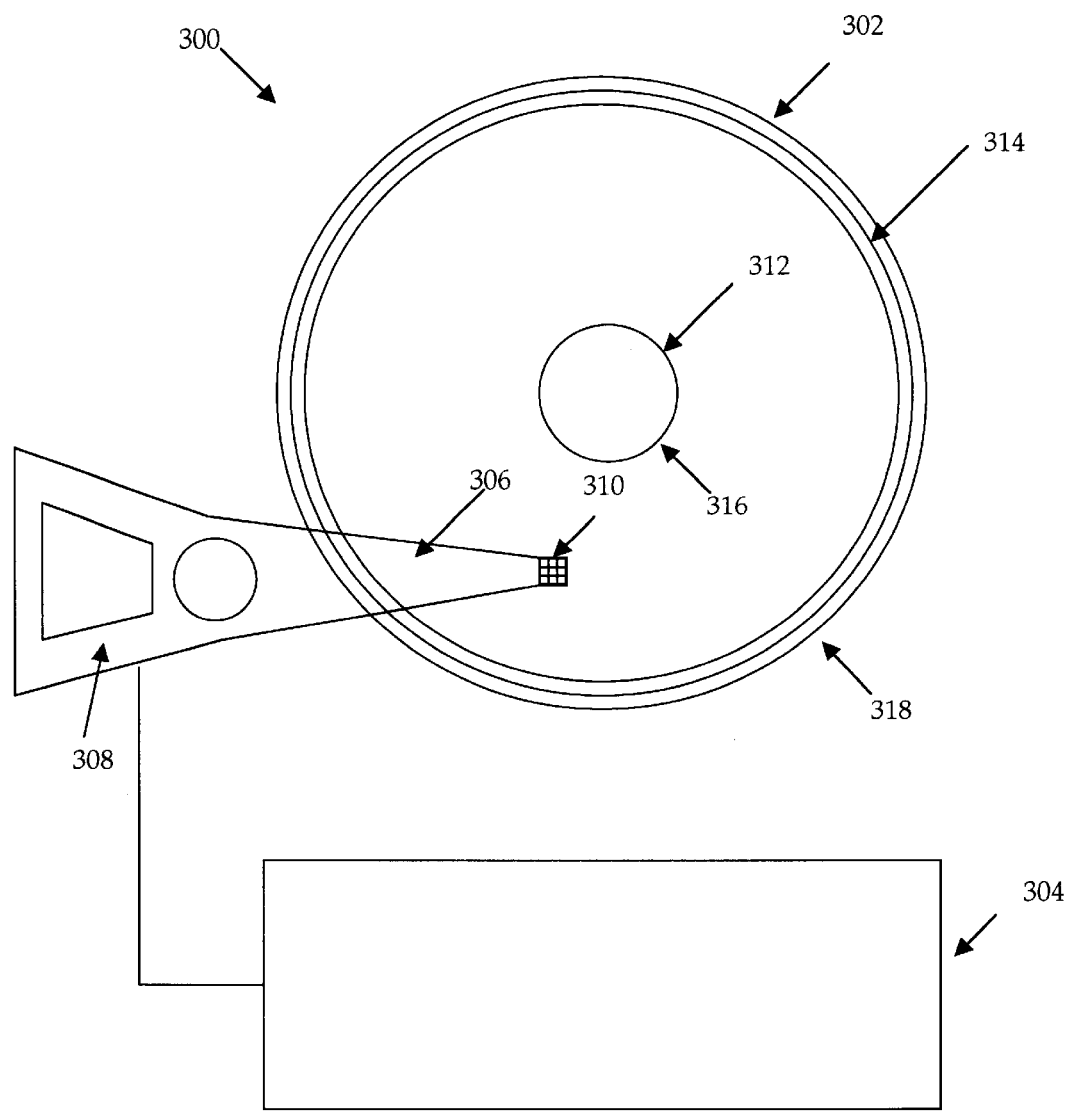
FIG. 3 depicts a data storage system that can be used with the present invention.

FIG. 3 depicts a data storage system that can be used with the present invention. In this exemplary embodiment, data storage system 300 is a hard disk drive system that utilizes a patterned storage disk to store data. Data storage system 300 includes one or more storage disks 302, a storage system controller 304, an actuator 306, a voice coil motor 308, a recording head 310, and a rotating spindle 312. The recording head 310 is positioned at the end of actuator 306 which is moved via voice coil motor 308, and transfers data between storage system controller 304 and a specific physical location on storage disk 302. Data is preferably stored in many approximately consecutively numbered concentric rings or "tracks". 314 on storage disk 302. For clarity, only two tracks 314 are shown in FIG. 3. The tracks are displaced radially from each other, beginning at the inner diameter 316 of the disk 302 and continuing to the outer diameter 318 of the disk 302.

Storage system controller 304 may randomly access a specific logical location on storage disk 302 via a particular track address and a particular sector address. Tracks 314 are very closely spaced in order to maximize storage capacity and economy. The mechanical precision of the movement of storage disk 302 and the movement of recording head 310 is critical to accessing the proper data storage location on storage disk 302. Storage system controller 304 thus requires some means for precisely positioning recording head 310 quickly and accurately over tracks 314 for subsequent storage and retrieval operations.

Figure 4:
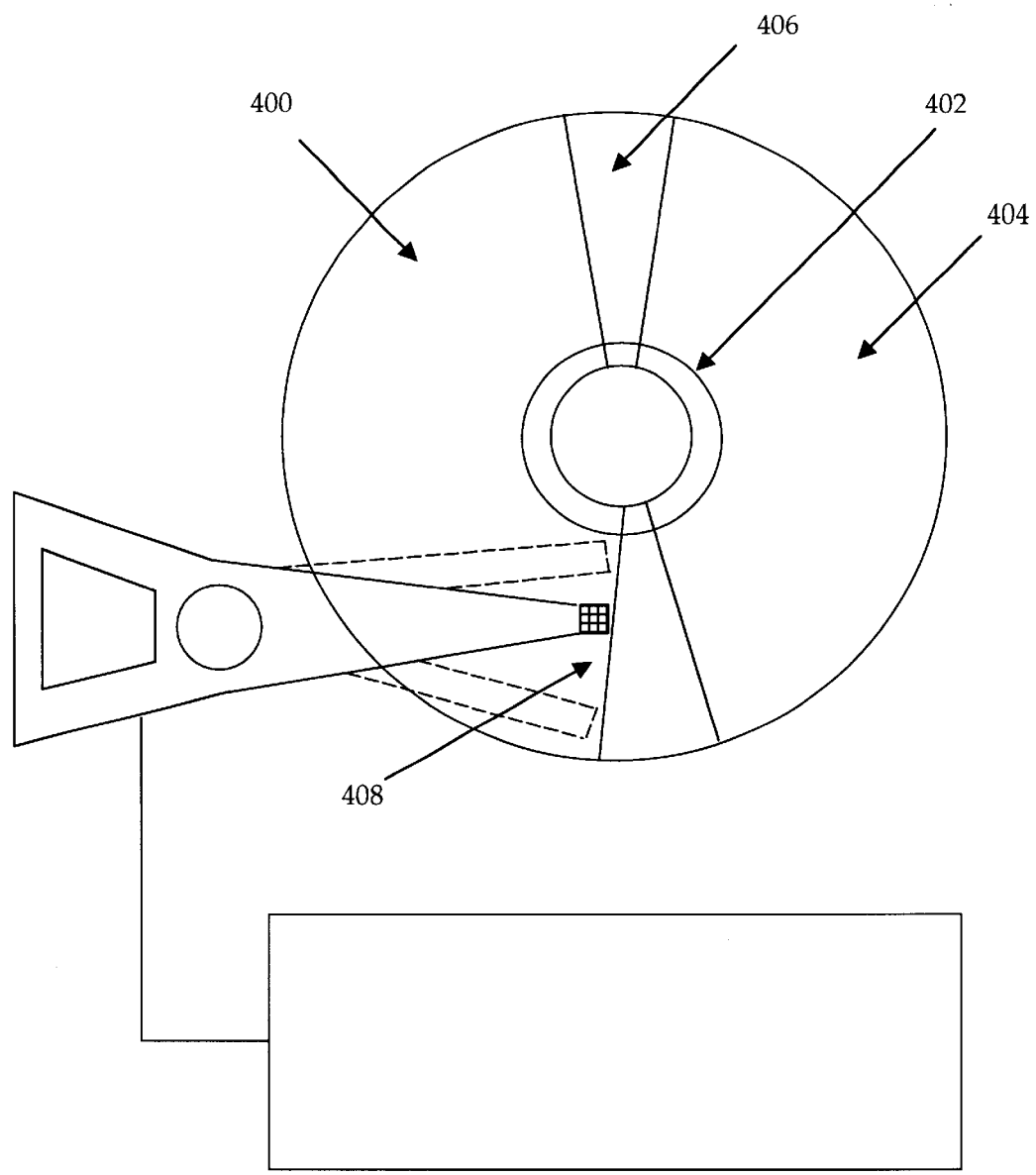
FIG. 4 illustrates a diagram of a surface of an exemplary storage disk.
Figure 5:
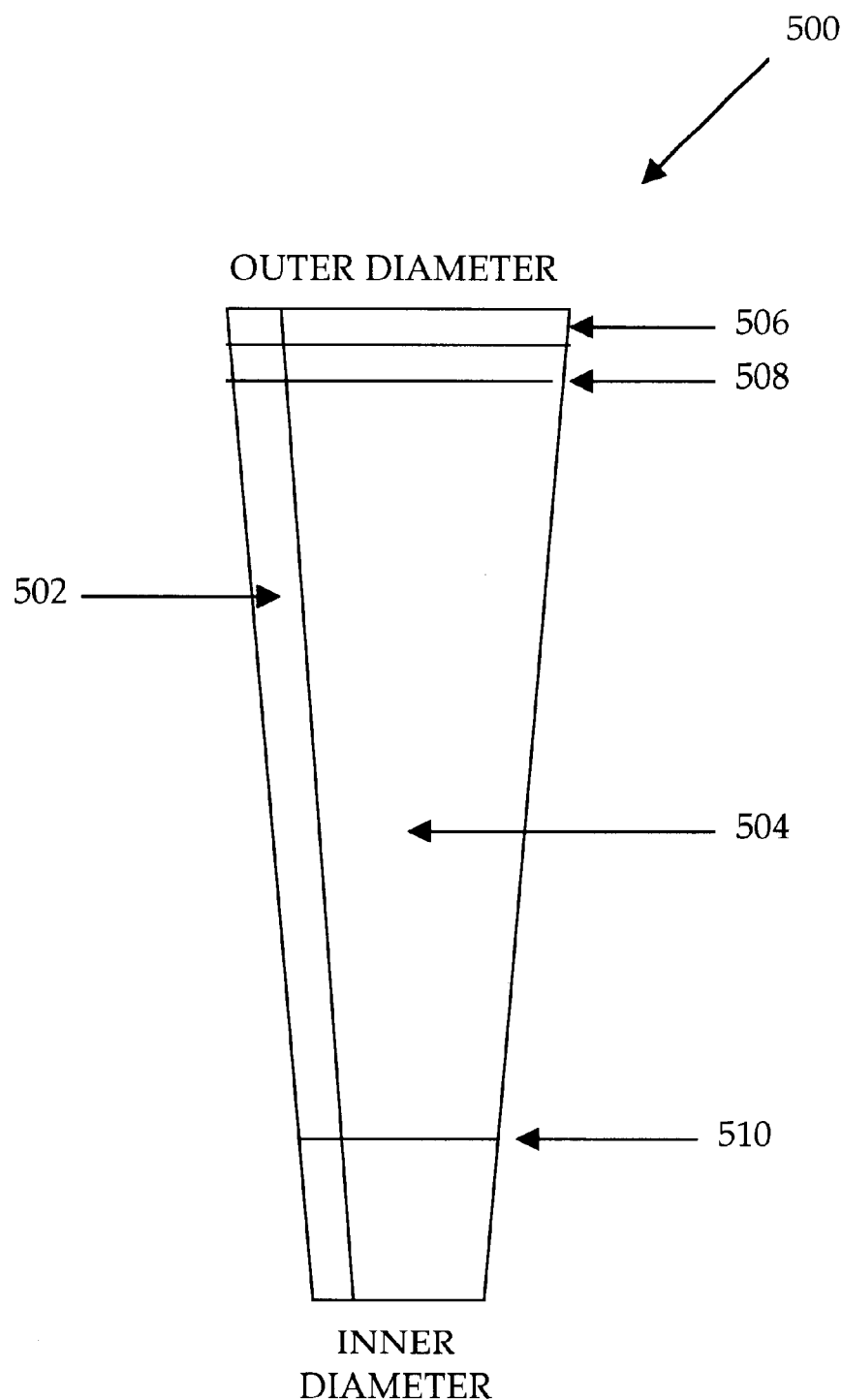
FIG. 5 depicts a linearized diagram of an exemplary sector illustrated in FIG. 4.

Referring now to FIG. 4, a diagram of a surface of an exemplary storage disk is illustrated. The surface 400 of storage disk 302 typically includes a landing zone 402, a useable data zone 404, arc-shaped sectors 406, and an arc-shaped path 408 taken across the surface 400 by recording head 310. A linearized diagram of an exemplary sector 406 is shown in FIG. 5. Sector 500 includes a servo sector 502, a data wedge 504, a pair of neighboring numbered concentric tracks 506 and 508, and a border 510 between landing zone 402 and useable data zone 404. Data wedge 504 includes stored user data, while servo sector 502 includes address and alignment information used by the disk drive system.

Figure 6A:
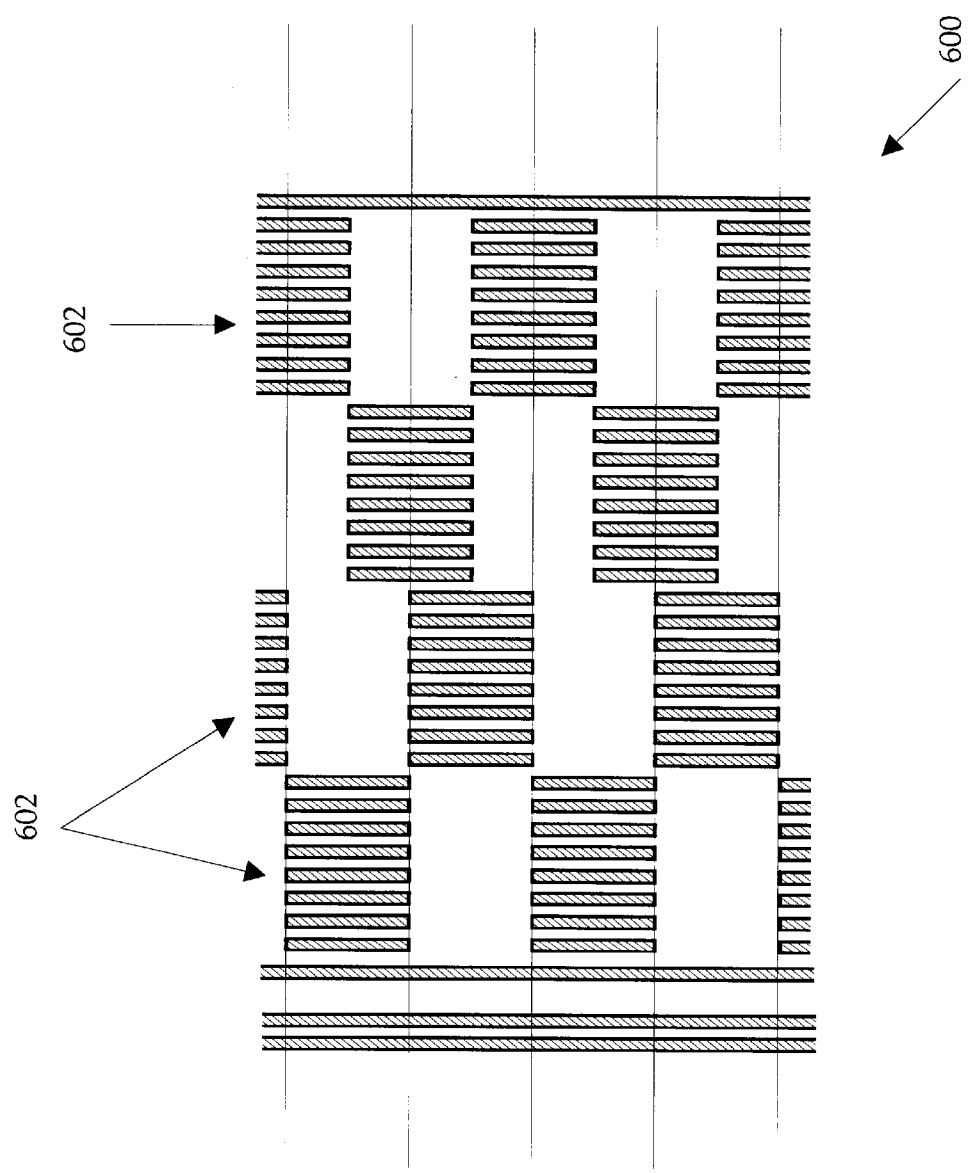
FIGS. 6(a)–6(c) illustrate exemplary servo sector patterns that can be used with the present invention.
Figure 6B:
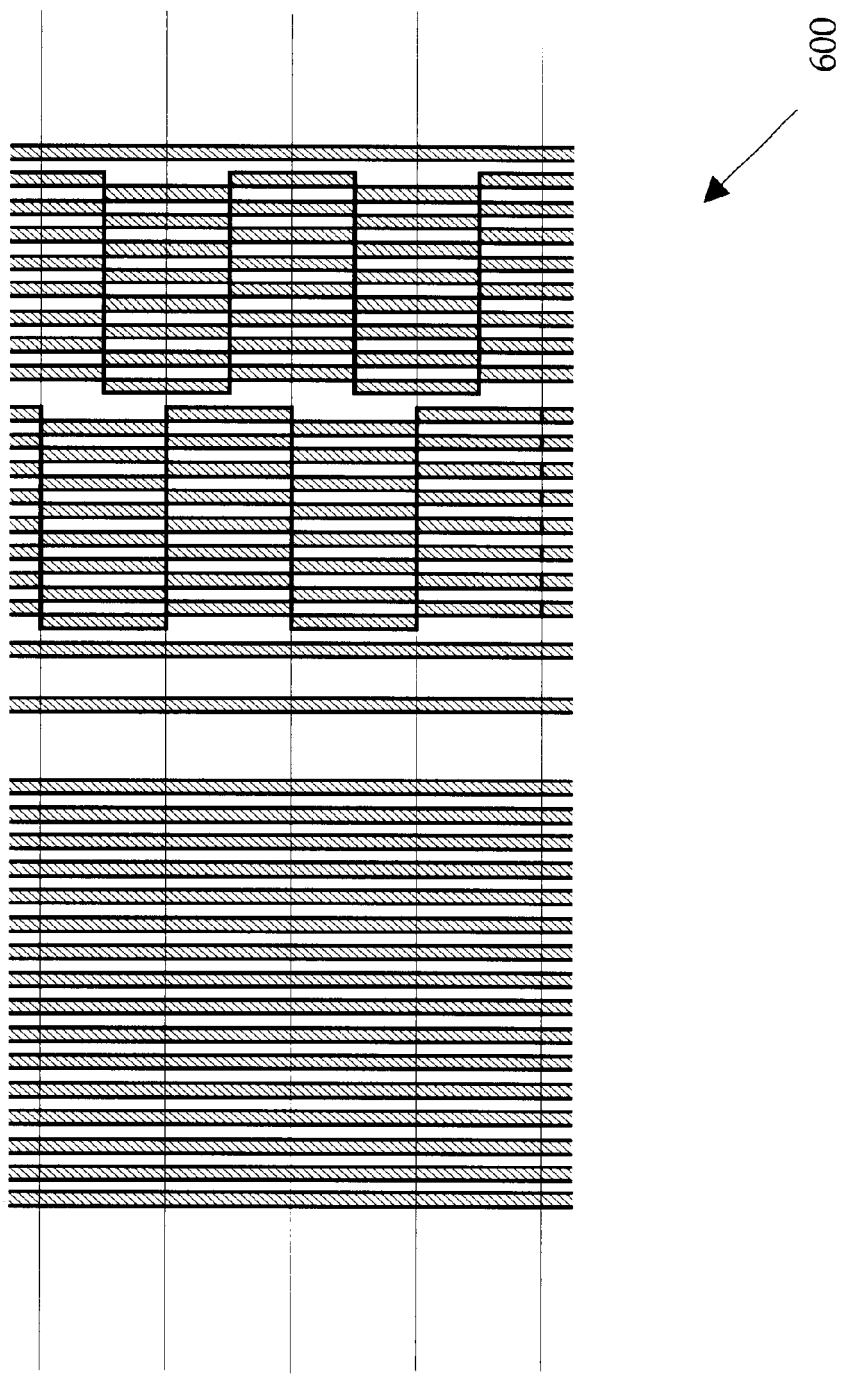
Figure 6C:
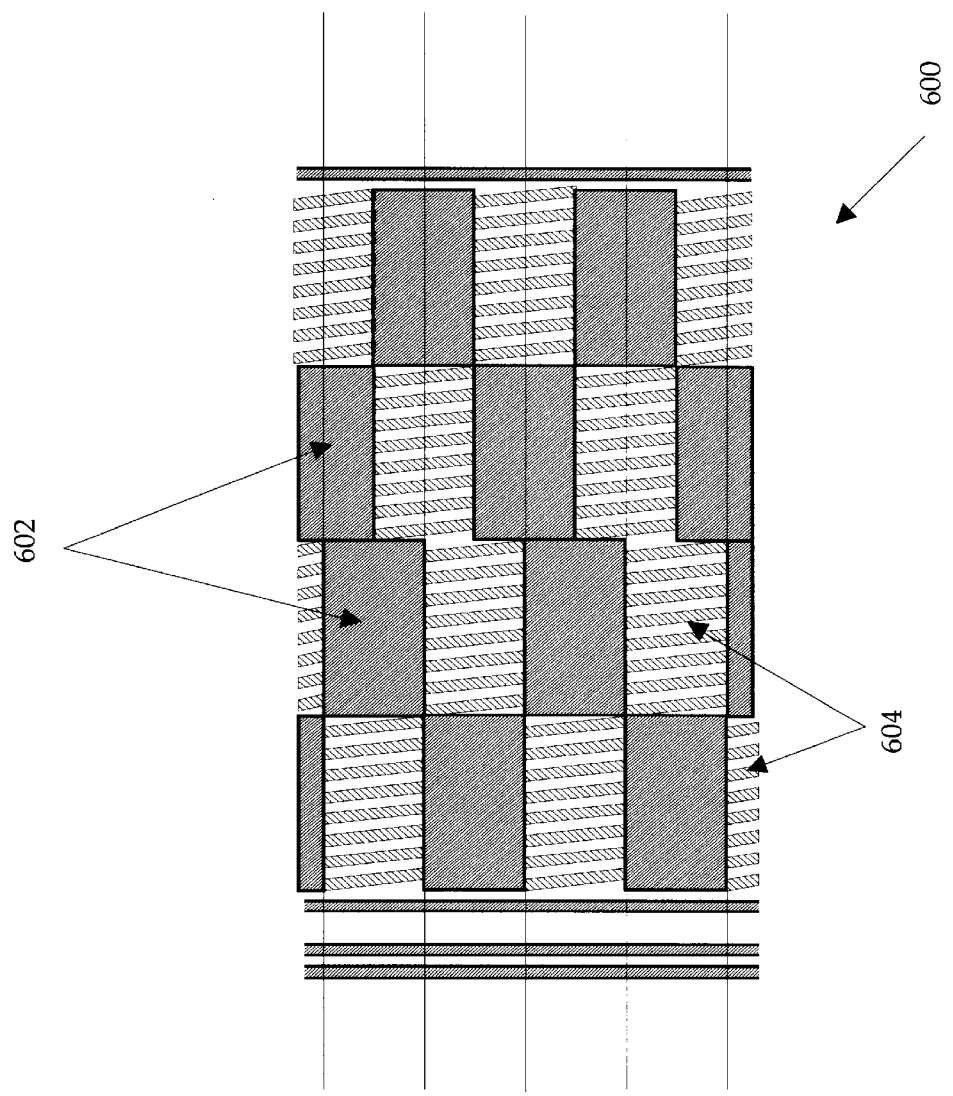

FIGS. 6(a)–6(c) illustrate exemplary patterned servo sector patterns that can be used with the present invention. The servo sector format 600 is created by forming a combination of raised features and depressed features in or on the surface of the storage disk. A depressed feature is known as a pit, and the separators 604 are comprised of pits.

In each of these examples, an initialization procedure is performed by DC erasing the disk using a offset recording head, where the writer is positioned to the outer diameter from the reader. The bit patterned servo sector 600 in FIG. 6(a) is comprised of a plurality of servo burst fields 602 that are patterned on the storage disk. Each servo burst field is comprised of a plurality of patterned bits. In FIG. 6(a), the plurality of servo burst fields 602 are shown as a quadrature pattern comprised of an A burst, a B burst, a C burst and a D burst. The horizontal lines depict the center of the tracks.

The servo burst fields 602 form "rulers" in this exemplary embodiment. A ruler is a position-sensing pattern that defines the radial position of a recording head. The rulers are patterned onto the disk before the disk is assembled into a storage system. Since the servo burst fields 602 are comprised of a quadrature pattern, one set of four bursts is used in each ruler in this embodiment. In other words, an A burst, B burst, C burst, and D burst are included in each ruler. The four burst pattern can be grouped such that the individual bursts are organized in any order.

The present invention, however, is not limited to a quadrature pattern. Other servo burst fields, including amplitude patterns (e.g. null pattern, split burst pattern) and phase patterns, can be used with the present invention. For example, FIG. 6(b) depicts a null pattern that can be used with the present invention. In yet another alternative embodiment shown in FIG. 6(c), a plurality of burst separators 604 are patterned on the disk and the servo burst fields 602 are written magnetically between the separators 604.

The servo sector patterns in FIGS. 6(a)–6(c) can be used with the present invention in several ways. First, the complete servo sector pattern is patterned on the disk and will be used for both the determination of the radial correction factors and the final servo pattern. After the radial correction factors (discussed with reference to FIG. 9) are determined, they are written on the disk (or stored in a correction table) and used for subsequent read and write operations. The recording head will follow a concentric track on the disk by using the radial correction factors.

Alternatively, only a portion of the servo pattern can be patterned on the disk, while the rest of the servo pattern is written magnetically. In this embodiment, both the patterned servo pattern and the magnetically written portion are used with the final servo pattern. After the radial correction factors are determined, they are written on the disk (or stored in a correction table) and used for subsequent read and write operations.

Yet another alternative is to pattern a simple ruler onto a disk and use that simple ruler as a guide pattern. For example, FIG. 6(a) can be modified to create a guide pattern by using only one bit per servo burst field. This guide pattern is used to determine the radial correction factors, but is not used as part of the final servo sector pattern. The final servo pattern is written magnetically using the radial correction factors so that the final servo pattern is written with concentric tracks on the disk.

Figure 7A:
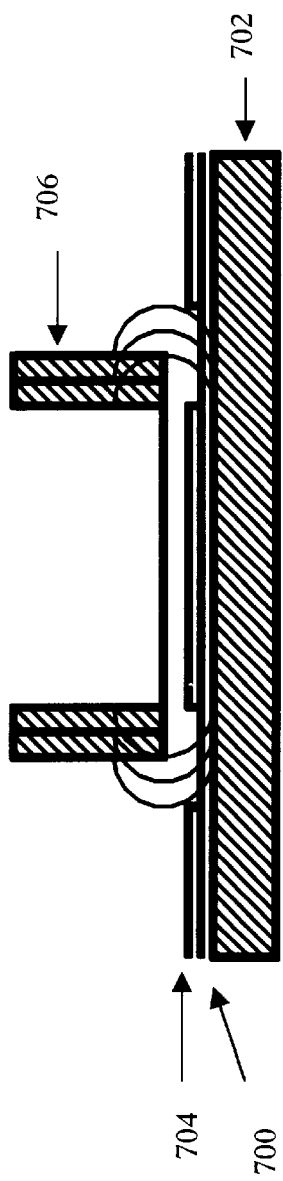
FIG. 7(a) depicts a patterned media that has been fabricated using one exemplary fabrication method.
Figure 7B:
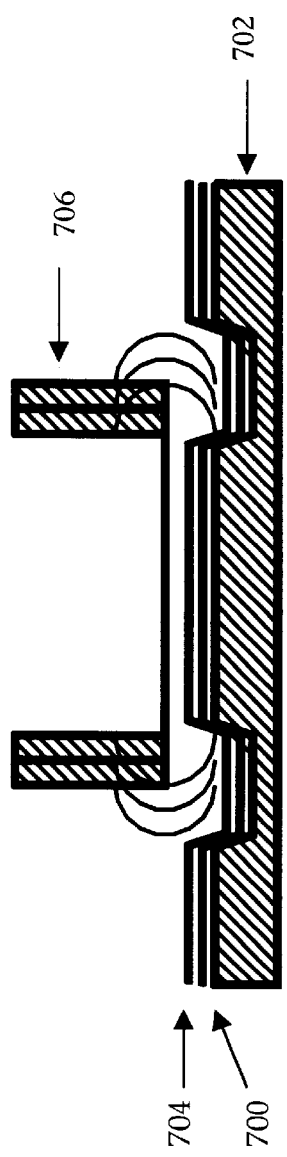
FIG. 7(b) illustrates a patterned media that has been fabricated using an alternative exemplary fabrication method.

FIGS. 7(a)–7(b) are diagrams that will be used to describe two alternate exemplary methods for patterning a media according to the present invention. Both methods utilize a master to make a stamper. The master is created by first depositing a photoresist layer over a substrate. The photoresist material is then exposed to a pulsating electron or ion beam, where the pulsing of the beam is determined by the desired format pattern that is to be patterned into a magnetic media. The electron or ion beam has the ability to define very small features, and features as small as one hundred nanometers in size can be achieved with a deep UV machine, while features as small as ten nanometers can be obtained with a electron beam machine.

The stamper is then made from the master, and is a metal layer typically comprised of nickel. Because the photoresist layer is able to reproduce the format pattern accurately, the small format pattern is transferred faithfully to the stamper. In FIG. 7(a), a patterned media that has been fabricated using one exemplary fabrication method is shown. A first layer 700 is deposited over a substrate 702, followed by a recording layer 704. Typically, the first layer 700 is comprised of a chromium (Cr) layer, and the recording layer 704 is comprised of a cobalt chromium (CoCr) layer. Those skilled in the art will understand however, that other types of materials can be used for the first layer 700 and the recording layer 704.

A resist layer is then deposited over the recording layer (not shown). A stamper is then pressed into the resist layer in order to transfer a format pattern from the surface of the stamper into the surface of the resist layer. The stamper compresses some portions of the resist layer, while other portions retain their original thickness. After the stamper is removed, the compressed portions of the resist layer are etched away, until the underlying recording layer 704 is exposed. The etching process continues until portions of the recording layer 704 are removed, thereby creating regions that can not be magnetized. The remaining resist layer is then removed. The servo sector format on the patterned media is preferably defined by the edges of the recording layer 704. A read/write head 706 can then read from or write to the remaining recording layer 704.

FIG. 7(b) illustrates a patterned media that has been fabricated using an alternative exemplary fabrication method. A resist layer (not shown) is deposited over a substrate 702, and a stamper is pressed into the surface of the resist layer in order to transfer the format pattern from the surface of the stamper into the surface of the resist layer (not shown). The stamper compresses some portions of the resist layer, while other portions retain their original thickness. After the stamper is removed, the compressed portions of the resist layer are etched away, until the underlying substrate 702 is exposed. The etching process continues until a desired etch depth is reached in the substrate 702. Typically, an etch depth of fifteen to twenty-five nanometers is used.

The remaining resist layer is then removed, and a first layer 700 and recording layer 704 are deposited over the substrate. Both the first layer 700 and the recording layer 704 conform to the surface of the substrate 705, thereby creating a patterned media. The servo sector format for the patterned media is preferably defined by spacing loss.

Figure 8:
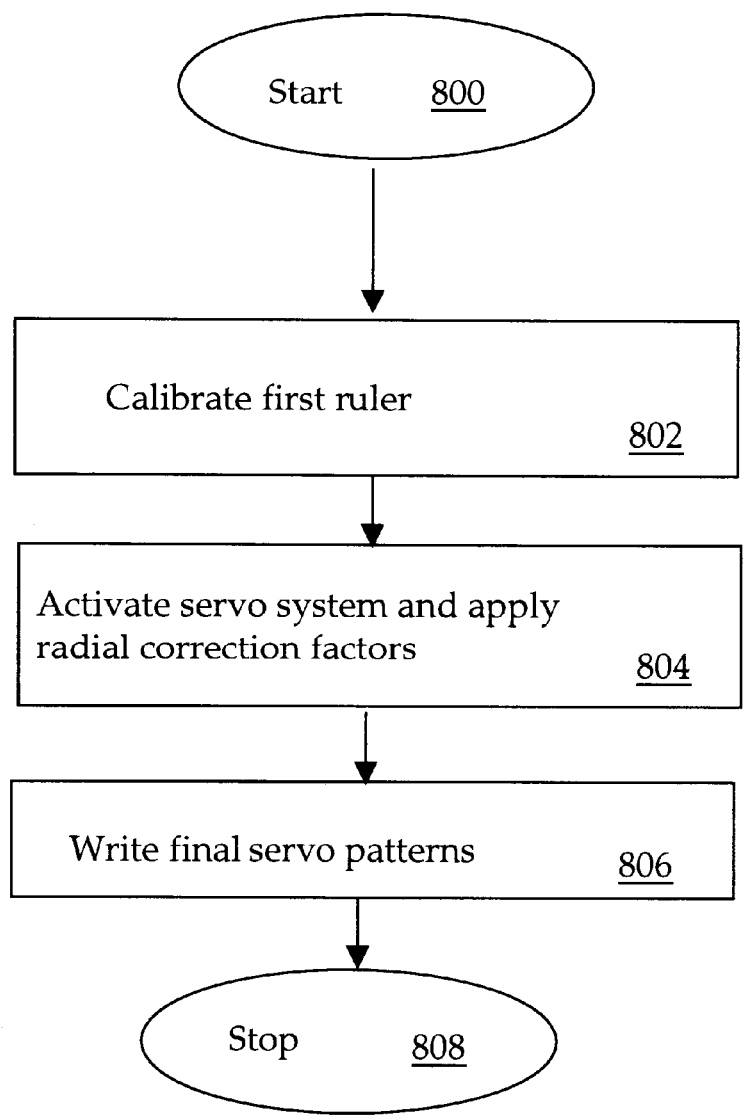
FIG. 8 is a flowchart illustrating a method for correcting the radial eccentricity in at least one data track according to the present invention.

Referring to FIG. 8, a flowchart illustrating a method for correcting the radial eccentricity in at least one data track according to the present invention is shown. The process begins at block 800 and thereafter passes to block 802, where a first ruler is calibrated. The method then continues at block 804 with the activation of the servo system and application of the radial correction factors determined in the previous step. When activated, the servo system will follow the eccentric track pattern. By applying the correction factors, the final servo pattern can be written in concentric tracks on the disk (block 806). The method then ends, as shown in block 810.

Figure 9:
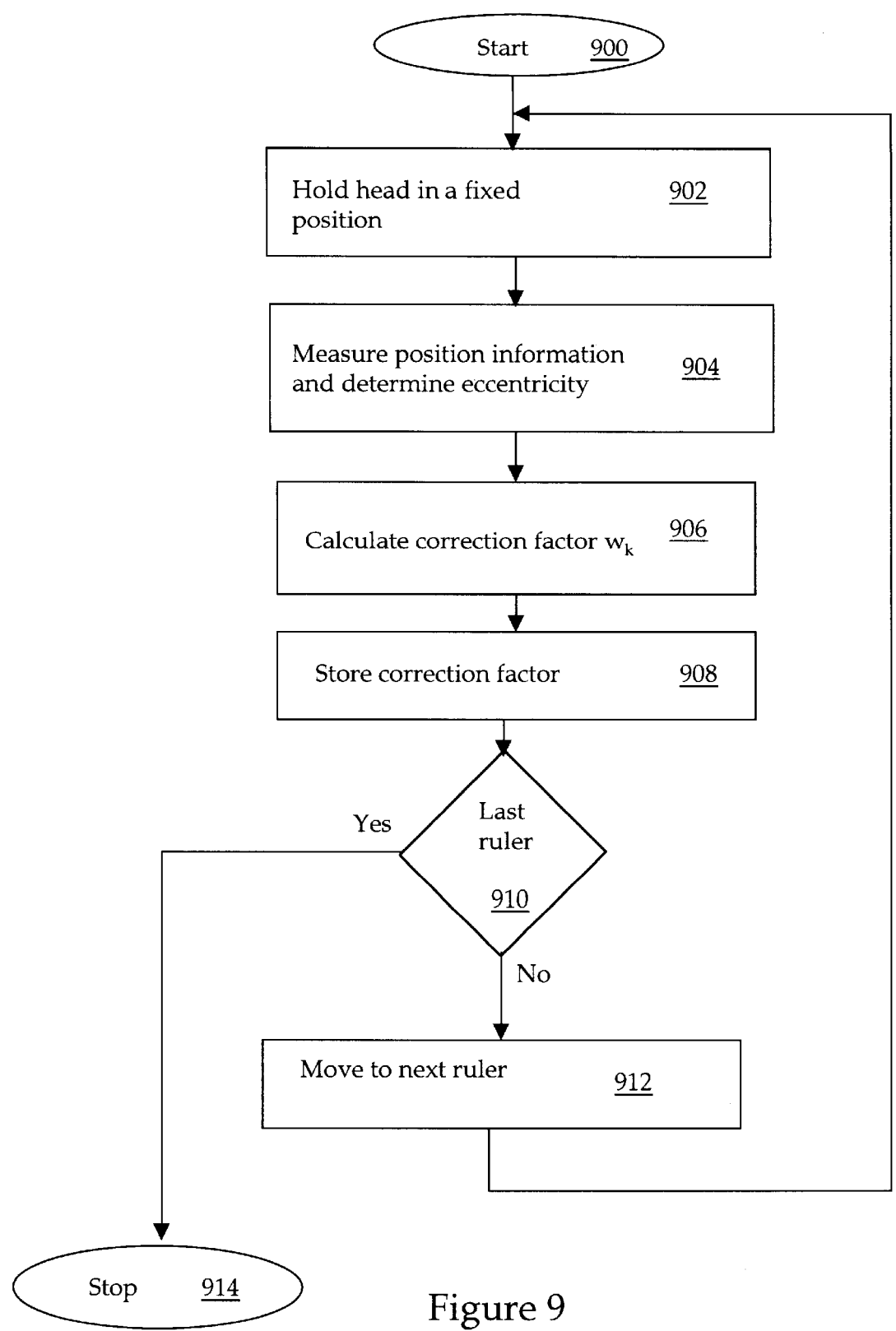
FIG. 9 is a flowchart illustrating the calibration step at block 802 in FIG. 8.

FIG. 9 is a flowchart illustrating the calibration step at block 802 in FIG. 8. The process begins at block 900 and thereafter passes to block 902 where the recording head is held in a fixed position. In one embodiment of the invention, the recording head is held in a fixed position by moving the actuator to the inner diameter of the disk until the actuator rests against the crash stop. A sufficient current is then applied to the voice coil motor to hold the actuator firmly against the crash stop. In an alternative embodiment, the recording head is held in a fixed position by moving the actuator to the outer diameter of the disk and holding it against that crash stop. In yet another embodiment, the recording head is held at both the inner and outer diameters by keeping the actuator firmly against the respective crash stops. The calibration process is performed at both locations. In this way, the calibration data for both positions can be interpolated between the two as the head moves from the inner diameter to the outer diameter.

The position information is then determined by reading the magnitude of the signal generated by the ABCD bursts at each ruler (block 904). In this exemplary embodiment, the position information is also synchronously averaged by reading the position information for several revolutions of the storage disk. Letting the disk rotate for several revolutions allows the noise generated by non-repeatable disturbances to be averaged over time and can therefore minimize the effects of the noise from non-repeatable disturbances. Disk flutter, bearing imperfections, and spindle vibration are examples of non-repeatable disturbances.

Referring again to FIG. 9, the radial correction factor $w_k$ is then determined (block 906). The radial correction factors are derived as $w_k = -Y_{mk}$ where $-Y_{mk}$ denotes the average of the position measurements at ruler k. The radial correction factor is then saved, as shown in block 908. In this exemplary embodiment, the radial correction factor is stored in a memory, such as flash memory. Typically, one radial correction factor should be determined for each ruler. Thus, the number of radial correction factors equals the number of rulers on the disk. Therefore, a decision is made at block 910 as to whether there are remaining rulers on the disk. If so, the process continues at block 912 by moving to the next ruler and returning to block 902. This process continues until radial correction factors have been determined for each ruler, at which point the process ends (block 914).

Figure 10:
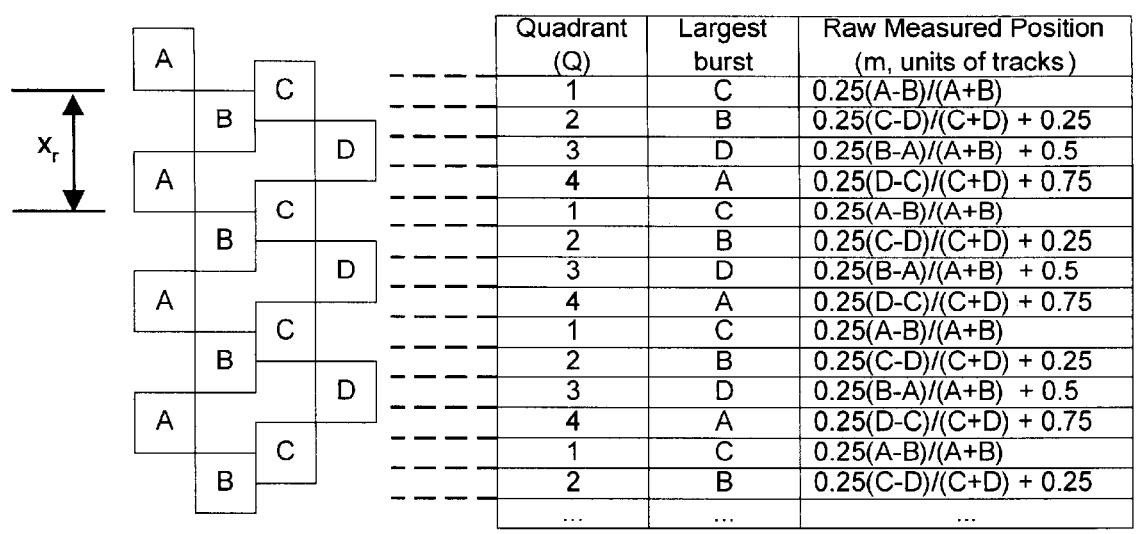
FIG. 10 illustrates a ruler subdivided into four quadrants.

FIG. 10 illustrates. a ruler subdivided into four quadrants. When the head moves from quadrant 4 to quadrant 1 the measured position information returns to an initial value defined by the equation 0.25(A−B)/(A+B). Thus, the number of times a head travels over a boundary must be taken into account when accurately determining the position of the head because the measured-position may include a "wrap over" value. The wrap over value is created by the repeating ABCD bursts as the head moves radially across the disk. As can been seen, as the head moves across a ruler boundary (e.g., from quadrant 1 to quadrant 4), the measured position information returns to the initial value. Therefore, the position information needs to be unwrapped by adding one when the head moves from quadrant 4 to quadrant 1, or by subtracting one when the head moves from quadrant 1 to quadrant 4.

Figure 11:
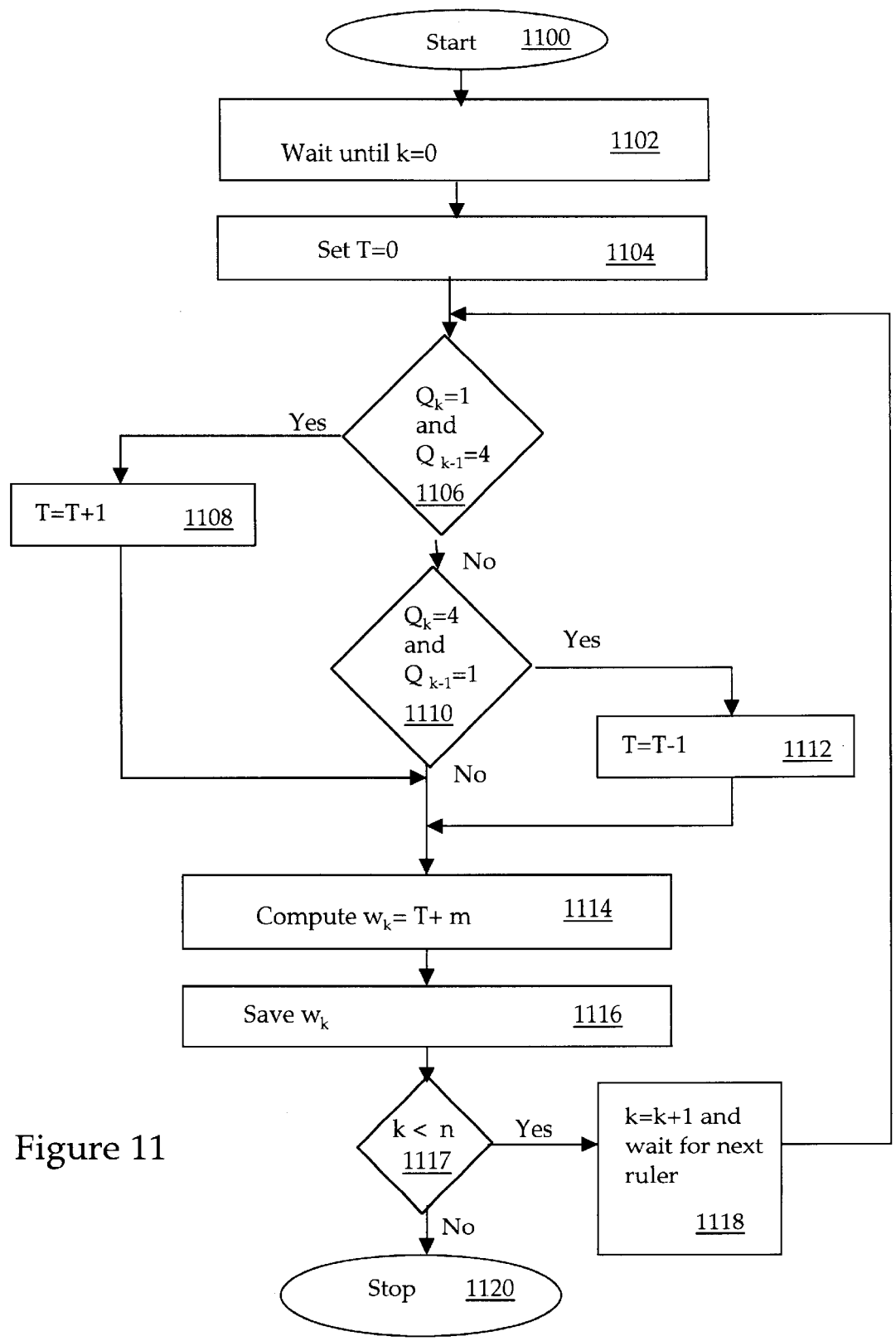
FIG. 11 depicts an alternative calibration step for block 802 in FIG. 8.

FIG. 11 depicts an alternative calibration step for block 802 in FIG. 8. The variable k denotes the ruler number and $Q_k$ denotes the quadrant at the $k^{th}$ ruler. The variable T denotes the number of wrap-overs from quadrant 4 to 1 minus the number of wrap-overs from quadrant 1 to 4.

The process begins at block 1100 and thereafter passes to block 1102, where the system waits until, the ruler number equals zero, and then sets T equal to zero (block 1104). If $Q_k$ equals 1 and $Q_{k-1}$ equals four, then T=T+1, as shown in blocks 1106 and 1108. If however, If $Q_k$ equals 4 and $Q_{k-1}$ equals 1, then T=T−1 (blocks 1110 and 1112). The correction factor $w_k$ is then computed at block 1114 by adding T to the measured position information $m_k$. The correction factor $w_k$ is stored, as shown in block 1116. If the ruler number (k) is less than the number of rulers (n), then the variable k is incremented and the system waits for the next ruler (blocks 1117 and 1118). The process then returns to block 1104 and repeats until k=n. When k equals n, the process ends at block 1120.

As discussed earlier, a correction factor is determined for each ruler. Thus, the memory requirement to store all of the correction factors can be significant. One alternative to storing all of the correction factors is to store the correction factors that cancel the low frequency disturbances only. The series of correction factors $w_0 \ldots w_k$ can be considered as a sampled signal, and will be referred to as W. When it is desirable to eliminate the eccentricity only at the first harmonic of the spindle rotation frequency, only the DC component and the first harmonic of signal W need to be stored. The higher harmonics can be eliminated. To do this, a discrete Fourier transform is applied to W, where $f_0, f_1, \ldots, f_n$ denote the elements of the Fourier series. Assume the element $f_0$ is the magnitude of the DC component, $f_1$ is the complex magnitude of the first harmonic, and so on. Then the correction factors at each ruler can be derived as follows:

$$w_k = f_0 + Re(f_1)\cos(2\pi k/n) + Im(f_1)\sin e(2\pi k/n),$$

where Re(.) and Im(.) denote the real and imaginary values of the arguments, respectively. Thus, only coefficients f0 and f1 have to be stored instead of the all of the correction values. This can reduce the amount of memory required to store the correction values.

Figure 12:
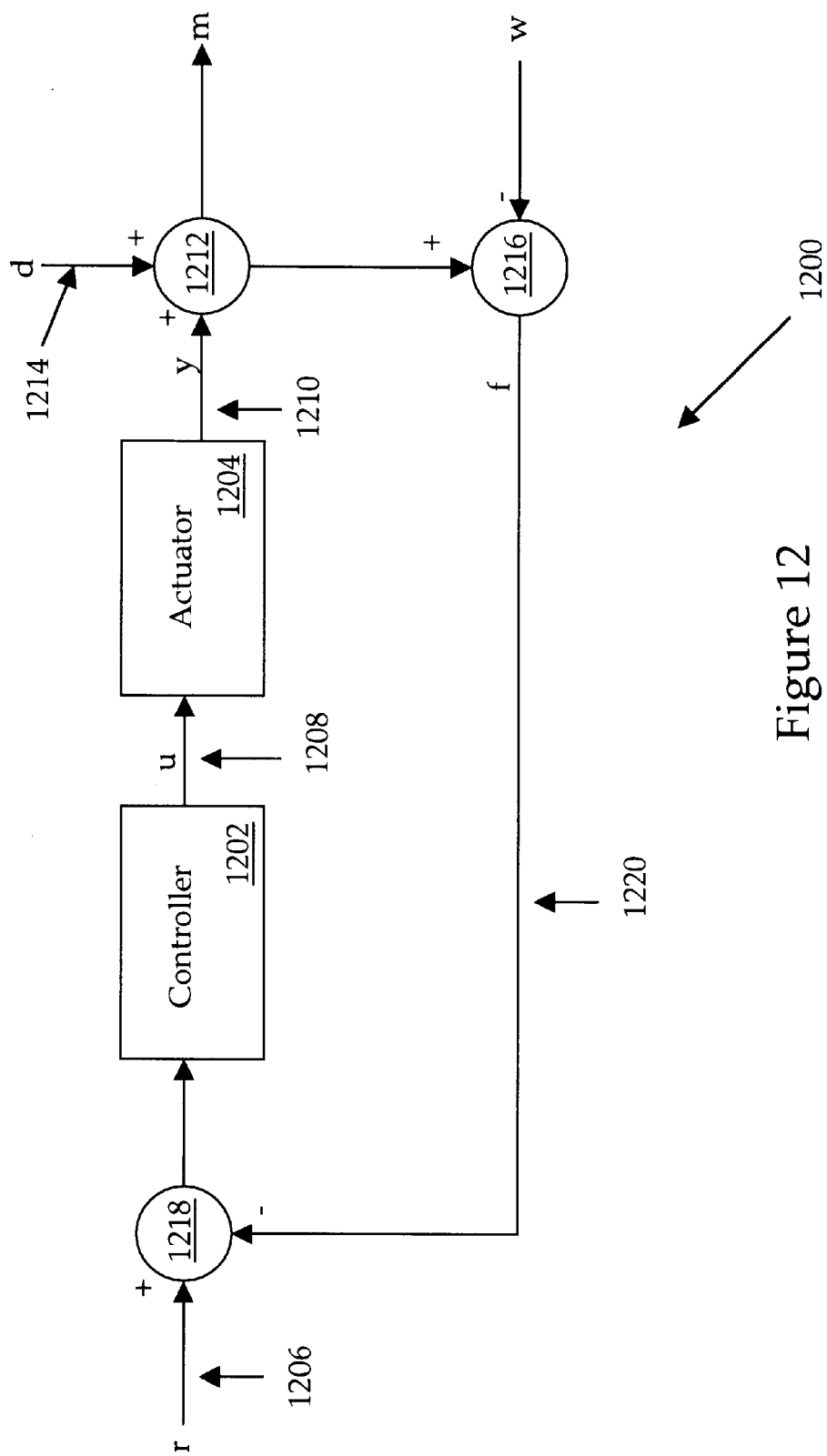
FIG. 12 is a block diagram depicting a servo system for a data storage system according to the present invention.

FIG. 12 is a block diagram depicting a servo system for a data storage system according to the present invention. The servo system 1200 includes a controller 1202 and an actuator 1204. In the exemplary embodiment, the controller 1202 is comprised of a microprocessor. The current position of the recording head (r) is input into the controller via signal line 1206. The controller 1202 then generates a signal u, typically a current signal, on line 1208. Signal u causes the actuator to move, and a position for the head (y) is output on line 1210. Repeatable disturbances (eccentricity) and non-repeatable disturbances generate noise and this noise signal (d) is input into a first summing block 1212 via line 1214. The measured position from the patterned media $y_m$ is the sum of the position signal y and the noise signal d.

The signal $y_m$ is input into second summing block 1216 along with a radial correction factor w. The combination of these two signals is fed back (feedback signal f) to a third block 1218 via line 1220, where the feedback signal f is subtracted from the current position signal r and input into controller 1202. Subtracting the feedback signal f from the signal r has the desired result of canceling the eccentricity and other repeatable disturbances.

Figure 13:
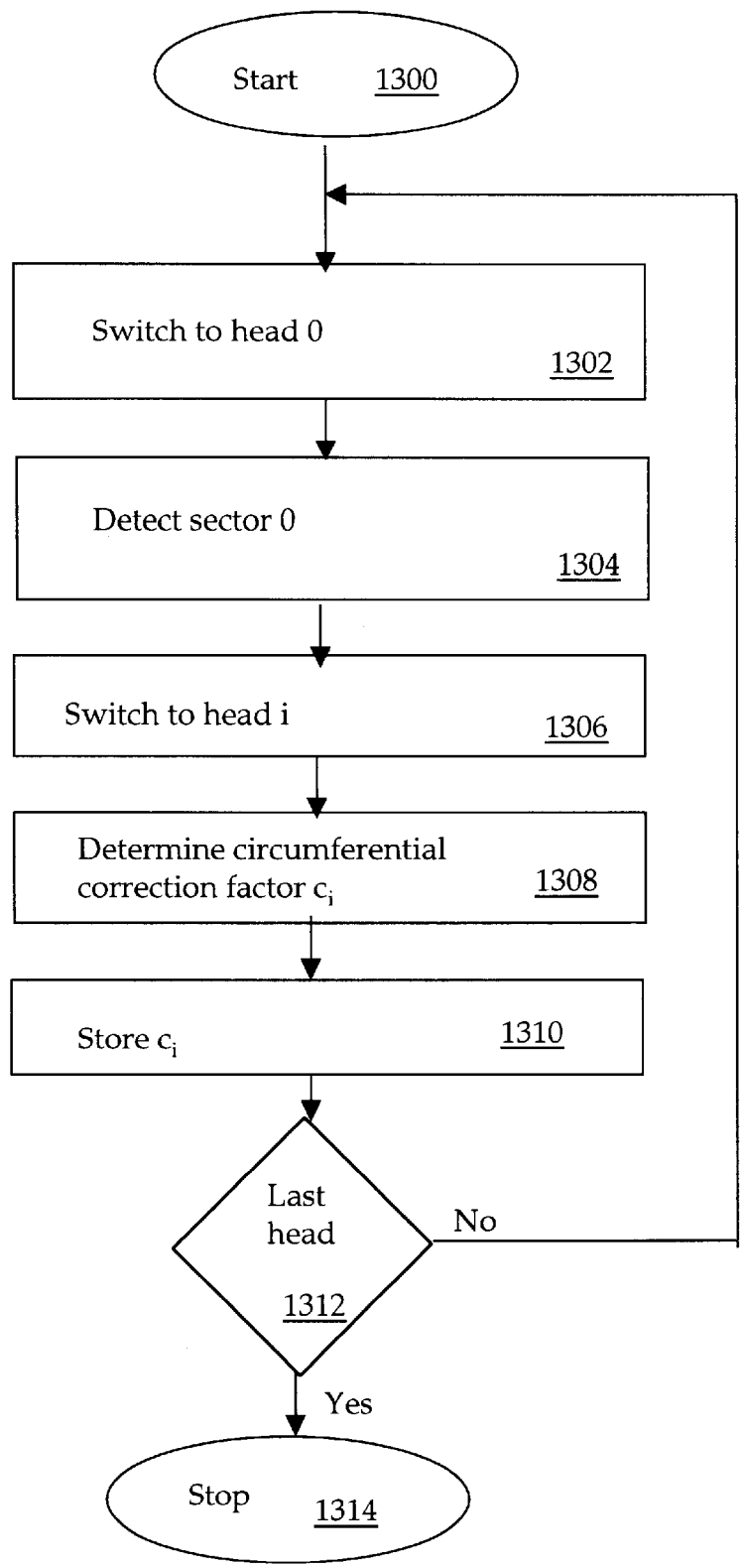
FIG. 13 is a flowchart illustrating a method for calibrating the circumferential misalignment for each disk surface in a data storage system according to the present invention.

Referring to FIG. 13, a flowchart illustrating a method for calibrating the circumferential misalignment for each disk surface in a data storage system according to the present invention is shown. The number of servo sectors are numbered from zero (0) to m, and the number of heads and their corresponding disk surfaces are numbered from zero (0) to h. The variable $k_m$ represents the sector number provided by the pattern, and the variable $k_c$ denotes the corrected sector number.

The process begins at block 1300 and thereafter passes to block 1302, where the system switches to head 0. As the disk surface rotates, the system waits until sector zero is detected, as shown in block 1304. When sector 0 is detected, the system switches to head i, where $1 \leq i \leq h$. The circumferential correction factor is then set to the number of the next sector detected by head i (block 1308). The circumferential correction factor is stored in memory, such as flash memory.

The process continues at block 1312 where a decision is made as to whether that was the last head in the storage system. If not, the method returns to block 1302 and continues for each head in the system. When the last head is reached, the process ends at block 1314.

A corrected sector number is determined by redefining the original sector numbers using the circumferential correction factors. During normal operation of the storage system the corrected sector numbers are determined by the equation $k_c = mod(k_m - c_i + m, m)$, where mod(a,b) denotes the remainder of the division a/b. This insures that the circumferential disk-to-disk misalignment of the corrected sectors is less than the interval between two adjacent sectors. During normal operation of the storage system the corrected sector numbers are used to provide circumferential position information for the read and write operations.

While the invention has been particularly shown and described with reference to a preferred embodiment, it will be understood by those skilled in the art that various changes in form and detail may be made therein without departing from the spirit and scope of the invention.

What is claimed is:
1. A method comprising the steps of:
   calculating at least one radial correction factor for at least one ruler based on a measured position information, the at least one ruler defined by a patterned media; and applying the at least one radial correction factor when writing data on the patterned media, whereby the data is written in at least one concentric track on the patterned media.

2. The method of claim 1, further comprising the step of storing the at least one radial correction factor in a memory.

3. The method of claim 1, wherein the step of calculating at least one correction factor for each ruler based on the measured position information comprises averaging the measured position information for each ruler.

4. The method of claim 1, wherein the step of calculating at least one correction factor for each ruler comprises adding the number of wrap overs (T) to the measured position information, wherein the number of wrap overs accounts for the number of times the recording head travels over a boundary within each ruler as the recording head moves over the patterned media.

5. The method of claim 4, wherein the step of adding the number of wrap overs to the measured position information comprises the steps of:

dividing each ruler into four quadrants;

setting the number of wrap overs to zero (T=0) when a particular ruler number equals zero (k=0);

if $Q_k$ equals 1 and $Q_{k-1}$ equals four, then incrementing T by one (T=T+1), where k denotes the ruler number and $Q_k$ denotes the quadrant at the $k^{th}$ ruler;

if $Q_k$ equals 4 and $Q_{k-1}$ equals 1, then decrementing T by one (T=T−1); and calculating a correction factor for the particular ruler k by adding T to the measured position information, whereby the variable T denotes the number of wrap-overs from quadrant 4 to 1 minus the number of wrap-overs from quadrant 1 to 4.

6. A control system comprising;

an actuator;

a controller coupled to the actuator, wherein an output signal of the controller is input into the actuator and causes the actuator to move to the particular location; and a radial correction factor signal that is fed back into the controller, wherein the radial correction factor signal is based on a pattern defined by a patterned surface and is combined with a measured position signal to correct for any repeatable disturbances that create radial misalignment associated with a surface.

7. A system for correcting radial misalignment of at least one track on a patterned media, the system comprising:

means for holding at least one recording head in a fixed position over at least one track on the patterned media;

means for measuring position information from at least one ruler on the at least one track;

means for calculating at least one radial correction factor for each ruler based on the measured position information; and means for applying the at least one radial correction factor when writing data on the patterned media, whereby the data is written in at least one concentric track on the patterned media.

8. The system of claim 7, further comprising means for storing the at least one radial correction factor in a memory.

9. The system of claim 8, wherein the means for calculating at least one correction factor for each ruler based on the measured position information comprises means for averaging the measured position information for each ruler.

10. The system of claim 8, wherein the means for calculating at least one correction factor for each ruler comprises means for adding the number of wrap overs (T) to the measured position information, wherein the number of wrap overs accounts for the number of times the recording head travels over a boundary within each ruler as the recording head moves over the patterned media.

11. The system of claim 10, wherein the means for adding the number of wrap overs to the measured position information comprises:

means for dividing each ruler into four quadrants;

means for setting the number of wrap overs to zero (T=0) when a particular ruler number equals zero (k=0);

if $Q_k$ equals 1 and $Q_{k-1}$ equals four, then means for increment T by one (T=T+1), where k denotes the ruler number and $Q_k$ denotes the quadrant at the $k^{th}$ ruler;

if $Q_k$ equals 4 and $Q_{k-1}$ equals 1, then means for decrementing T by one (T=T−1); and means for calculating a correction factor for the particular ruler k by adding T to the measured position information, whereby the variable T denotes the number of wrap-overs from quadrant 4 to 1 minus the number of wrap-overs from quadrant 1 to 4.

12. A disk storage system, comprising:

a patterned media, wherein the media has at least one ruler patterned thereon; and a correction table stored in a memory, wherein the correction table is comprised of at least one radial correction factor that corrects for any radial misalignment in at least one track on the patterned media.

13. The disk storage system of claim 12, wherein the at least one ruler is included in the final servo pattern.

14. The disk storage system of claim 13, wherein a portion of the at least one ruler is included in the final servo pattern.

15. The disk storage system of claim 13, wherein the at least one ruler is not included in the final servo pattern.

* * * * *